(12) United States Patent
Hsiao et al.

(10) Patent No.: US 8,882,331 B2
(45) Date of Patent: Nov. 11, 2014

(54) WARPING BUFFERING STRUCTURE FOR LIGHT GUIDE PLATE AND BACKLIGHT MODULE

(71) Applicant: Shenzhen China Star Optoelectronics Technology Co., Ltd., Guangdong (CN)

(72) Inventors: Yuchun Hsiao, Guangdong (CN); Weifeng Chen, Guangdong (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 113 days.

(21) Appl. No.: 13/810,211

(22) PCT Filed: Dec. 7, 2012

(86) PCT No.: PCT/CN2012/086103
§ 371 (c)(1),
(2), (4) Date: Jan. 15, 2013

(87) PCT Pub. No.: WO2014/082330
PCT Pub. Date: Jun. 5, 2014

(65) Prior Publication Data
US 2014/0211509 A1 Jul. 31, 2014

(30) Foreign Application Priority Data
Nov. 30, 2012 (CN) ...................... 2012 2 0651309 U

(51) Int. Cl.
*F21V 7/04* (2006.01)
*G02F 1/133* (2006.01)
*F21V 8/00* (2006.01)

(52) U.S. Cl.
CPC .............. *G02B 6/0093* (2013.01); *G02F 1/133* (2013.01)

USPC ........................................... 362/632; 362/97.1

(58) Field of Classification Search
CPC ... G02B 6/0093; G02B 6/0085; G02B 6/0088
USPC ................................ 362/632, 633, 634, 97.1
See application file for complete search history.

(56) References Cited

U.S. PATENT DOCUMENTS

2009/0080148 A1* 3/2009 Sugawara ................ 361/679.02
2009/0103328 A1* 4/2009 Iwasaki ......................... 362/617
2011/0103040 A1* 5/2011 Teragawa ..................... 362/97.1

OTHER PUBLICATIONS

International Search Report for International application No. PCT/CN2012/086103 Jul. 11, 2013.*

* cited by examiner

*Primary Examiner* — Nimeshkumar Patel
*Assistant Examiner* — Glenn Zimmerman

(57) ABSTRACT

The present disclosure provides a warping buffering structure for a light guide plate and a backlight module. The warping buffering structure includes: a first member with one side thereof contacting one end of the light guide plate of a backlight module; a second member with one side thereof flexibly connected to a side wall of a back cover of the backlight module, and the second member capable of sliding along an extending direction of the side wall; a first inclined surface formed on an end of one side of the first member which is away from the light guide plate; and a second inclined surface formed on an end of one side of the second member which is away from the side wall, and the second inclined surface contacting the first inclined surface and being slidably engaged with the second inclined surface.

16 Claims, 1 Drawing Sheet

WARPING BUFFERING STRUCTURE FOR LIGHT GUIDE PLATE AND BACKLIGHT MODULE

BACKGROUND

1. Technical Field

The present disclosure relates to technologies of liquid crystal displays, and particularly, to a warping buffering structure for a light guide plate and a backlight module.

2. Description of Related Art

A backlight module of a liquid crystal display, especially a edge-type backlight module, uses a light guide plate having high conductivity to refract the light to form a surface light source. A common light guide plate is made of polymethyl-methacrylate/polycarbonate (PMMA/PC) and is fixed to a back cover of the liquid crystal display by riveting columns. One side of the light guide plate adjacent to the light source is heated after the light source is in use for a long time, which causes the light guide plate to be expanded and further causes the warp of the light guide plate and thus influences the visual effect of the liquid crystal display.

SUMMARY

The present disclosure provides a warping buffering structure of a light guide plate and a backlight module which can effectively reduce the warp of the light guide plate when the light guide plate is heated and expanded.

The warping buffering structure for a light guide plate provided in the present disclosure includes:
- a first member with one side thereof contacting one end of the light guide plate of a backlight module;
- a second member with one side thereof flexibly connected to a side wall of a back cover of the backlight module, and the second member capable of sliding along an extending direction of the side wall;
- a first inclined surface formed on an end of one side of the first member which is away from the light guide plate; and
- a second inclined surface formed on an end of one side of the second member which is away from the side wall, and the second inclined surface contacting the first inclined surface and being slidably engaged with the second inclined surface.

Preferably, the first inclined surface and a vertical surface of one end of the first member adjacent to a bottom wall of the back cover form an angle ranging from 180 degrees to 270 degrees, and the second inclined surface and a vertical surface of one end of the second member adjacent to the bottom wall form an angle ranging from 90 degrees to 180 degrees.

Preferably, an inclined angle of the first inclined surface is complementary to that of the second inclined surface.

Preferably, the second member is flexibly connected to the side wall via a dovetail slot structure.

Preferably, the second member is flexibly connected to the side wall via the engagement between a screw and a sliding slot.

The present disclosure further provides another warping buffering structure for a light guide plate, including:
- a first member with one side thereof contacting one end of the light guide plate of a backlight module;
- a second member with one side thereof flexibly connected to a side wall of a back cover of the backlight module, and the second member capable of sliding along an extending direction of the side wall;
- a first inclined surface formed on an end of one side of the first member which is away from the light guide plate;
- a second inclined surface formed on an end of one side of the second member which is away from the side wall, and the second inclined surface contacting the first inclined surface and being slidably engaged with the first inclined surface; and
- a curved portion extending from the first member towards the light guide plate, and one side of the curved portion facing the light guide plate contacting an upper end of the light guide plate.

Preferably, the first inclined surface and a vertical surface of one end of the first member adjacent to a bottom wall of the back cover form an angle ranging from 180 degrees to 270 degrees, and the second inclined surface and a vertical surface of one end of the second member adjacent to the bottom wall form an angle ranging from 90 degrees to 180 degrees.

Preferably, an inclined angle of the first inclined surface is complementary to that of the second inclined surface.

Preferably, the second member is flexibly connected to the side wall via a dovetail slot structure.

Preferably, the second member is flexibly connected to the side wall via the engagement between a screw and a sliding slot.

The present disclosure further provides a backlight module, including:
- a light guide plate;
- a back cover; and
- a warping buffering structure for the light guide plate, including:
  - a first member with one side thereof contacting one end of the light guide plate of a backlight module;
  - a second member with one side thereof flexibly connected to a side wall of the back cover of the backlight module, and the second member capable of sliding along an extending direction of the side wall;
  - a first inclined surface formed on an end of one side of the first member which is away from the light guide plate; and
  - a second inclined surface formed on an end of one side of the second member which is away from the side wall, and the second inclined surface contacting the first inclined surface and being slidably engaged with the first inclined surface Preferably, the first inclined surface and a vertical surface of one end of the first member adjacent to a bottom wall of the back cover form an angle ranging from 180 degrees to 270 degrees, and the second inclined surface and a vertical surface of one end of the second member adjacent to the bottom wall form an angle ranging from 90 degrees to 180 degrees.

Preferably, an inclined angle of the first inclined surface is complementary to that of the second inclined surface.

Preferably, the second member is flexibly connected to the side wall via a dovetail slot structure.

Preferably, the second member is flexibly connected to the side wall via the engagement between a screw and a sliding slot.

Preferably, a curved portion extends from the first member towards the light guide plate, and one side of the curved portion facing the light guide plate contacts an upper end of the light guide plate.

With the warping buffering structure of the present disclosure, the warp of the light guide plate caused by the expansion of the light guide plate when the light guide plate is heated can be effectively reduced. Additionally, the self-locking structure formed by the inclined angle portion ensures that the warping buffering structure is stable and is not easy to fall off, which extends the service life of the light guide plate and the backlight module.

DESCRIPTION OF THE DRAWINGS

Many aspects of the embodiments can be better understood with reference to the following drawings. The components in the drawings are not necessarily dawns to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment is this disclosure are not necessarily to the same embodiment, and such references mean at least one.

Figure 1:
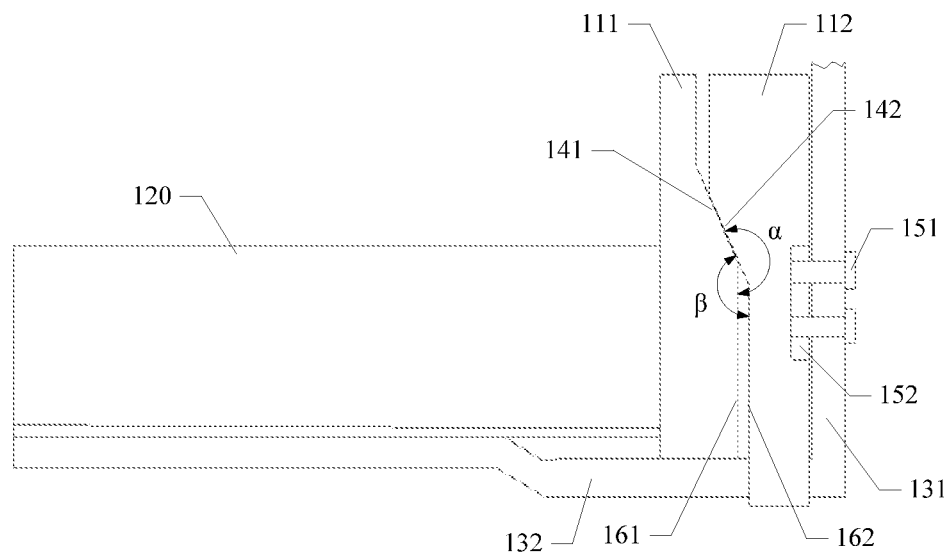
FIG. 1 is a schematic view of a warping buffering structure for a light guide plate in accordance with a first embodiment of the present disclosure.

Referring to FIG. 1, which is a schematic view of a warping buffering structure for a light guide plate in accordance with a first embodiment of the present disclosure. The warping buffering structure includes a first member 111 and a second member 112. One side of the first member 111 contacts one end of a light guide plate 120, and one side of the second member 112 is flexibly connected to a side wall 131 of a back cover of a backlight module. For example, the second member 112 can be flexibly connected to the side wall 131 of the back cover by the engagement between a screw 151 and a sliding slot 152 or can be flexibly connected to the side wall 131 by using a dovetail slot structure, which makes the second member 112 be capable of sliding along the extending direction of the side wall 131. A first inclined surface 141 is formed on an end of a side of the first member 111 away from the light guide plate 120, and a second inclined surface 142 is formed on an end of one side of the second member 112 away from the side wall 131. An angle α, ranging from 180 degrees to 270 degrees, is formed between the first inclined surface 141 and a vertical surface 161 which is formed on one end of the first member 111 adjacent to a bottom wall 132 of the back cover. An angle β, ranging from 90 degrees to 180 degrees, is formed between the second inclined surface 142 and a vertical surface 162 which is formed on one end of the second member 112 adjacent to the bottom wall 132. The inclined angle of the first inclined surface 141 is complementary to that of the second inclined surface 142, thus, the first inclined surface 141 and the second inclined surface 142 can contact each other and are slidably engaged with each other. When the light guide plate 120 is heated to be expanded, the light guide plate 120 abuts the first member 111, making the first member 111 exert a horizontal force onto the second member 112. Meanwhile, with the inclined surfaces, the first member 111 further exerts a vertical force onto the second member 112. After the light guide plate 120 is expanded, the light guide plate 120 drives the first member 111 to move towards the second member 112, and the second member 112 moves vertically upwards along the extending direction of the side wall 131. In this way, the light guide plate 120 can be prevented from being deformed when being heated and expanded, which reduces the warp of the light guide plate 120 and effectively extends the service life of the light guide plate 120.

Additionally, when the light guide plate 120 drives the first member 111 to move towards the second member 112 after being heated and expanded, the inclined angle portion of the second member 112 locks the first member 111 to form a self-locking structure. Thus, the first member 111 is vertically locked and is prevented from separating from the light guide plate 120 and the second member 112 when the light guide plate 120 is expanded or contracted, ensuring that the warping buffering structure is stable and is not easy to fall off.

Figure 2:
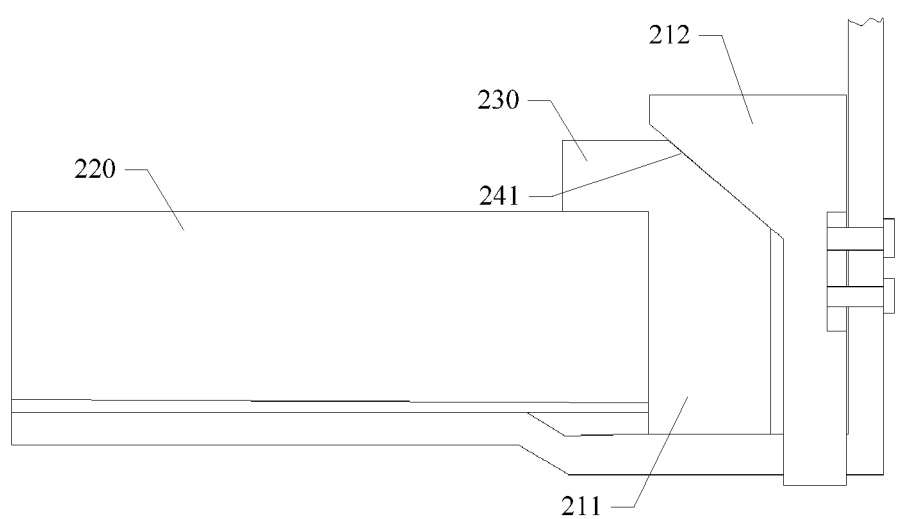
FIG. 2 is a schematic view of a warping buffering structure for a light guide plate in accordance with a second embodiment of the present disclosure.

Referring to FIG. 2, which is a schematic view of a warping buffering structure for a light guide plate in accordance with a second embodiment of the present disclosure. The difference between the warping buffering structure of the second embodiment and the warping buffering structure of the first embodiment lies that, a curved portion 230 extends from the first member 211 towards the light guide plate 220, and one side of the curved portion 230 facing the light guide plate 220 contacts an upper end of the light guide plate 220. When the light guide plate 220 is heated and expanded, one end of the light guide plate 220 abuts the first member 211. At this time, the first member 211 exerts a horizontal force and a vertical force onto the second member 212 via the first inclined surface 241, and meanwhile the upper end of the light guide plate 220 abuts the curved portion 230 to exert a vertical force onto the curved portion 230. The vertical force exerted onto the curved portion 230 is further exerted onto the second member 212 through the first inclined surface 241 to move the second member 212 upwards, which prevents the light guide plate 220 from being squeezed and deformed, reduces the warp of the light guide plate 220, and further effectively extends the service life of the light guide plate 220.

The present disclosure further provides a backlight module, including a light guide plate, a back cover, and a warping buffering structure for the light guide plate. The warping buffering structure for the light guide plate includes a first member and a second member. One side of the first member contacts one end of the light guide plate. One side of the second member is flexibly connected to a side wall of the back cover, and the second member is capable of sliding along the extending direction of the side wall of the back cover. A first inclined surface is formed on an end of one side of the first member away from the light guide plate, and a second inclined surface is formed on an end of one side of the second member away from the side wall. The second inclined surface contacts the first inclined surface and is slidably engaged with the first inclined surface.

The warping buffering structure for the light guide plate of the backlight module of the above embodiment can be the warping buffering structure of the embodiments shown in FIGS. 1 and 2, and the configuration and working principle of the warping buffering structure can be referred to that of the warping buffering structure of the above embodiments. With the warping buffering structure for the light guide plate of the above embodiments, the backlight module can reduce the warp of the light guide plate caused by the expansion of the light guide plate when the light guide plate is heated, thereby extending the service life of the backlight module.

Even though information and the advantages of the present embodiments have been set forth in the foregoing description, together with details of the mechanisms and functions of the present embodiments, the disclosure is illustrative only; and that changes may be made in detail, especially in matters of shape, size, and arrangement of parts within the principles of the present embodiments to the full extend indicated by the broad general meaning of the terms in which the appended claims are expressed.

What is claimed is:

1. A warping buffering structure for a light guide plate, comprising:
   a first member with one side thereof contacting one end of the light guide plate of a backlight module;
   a second member with one side thereof flexibly connected to a side wall of a back cover of the backlight module, and the second member capable of sliding along an extending direction of the side wall;
   a first inclined surface formed on an end of one side of the first member which is away from the light guide plate; and
   a second inclined surface formed on an end of one side of the second member which is away from the side wall, and the second inclined surface contacting the first inclined surface and being slidably engaged with the second inclined surface.

2. The warping buffering structure according to claim 1, wherein the first inclined surface and a vertical surface of one end of the first member adjacent to a bottom wall of the back cover form an angle ranging from 180 degrees to 270 degrees, and the second inclined surface and a vertical surface of one end of the second member adjacent to the bottom wall form an angle ranging from 90 degrees to 180 degrees.

3. The warping buffering structure according to claim 2, wherein an inclined angle of the first inclined surface is complementary to that of the second inclined surface.

4. The warping buffering structure according to claim 3, wherein the second member is flexibly connected to the side wall via a dovetail slot structure.

5. The warping buffering structure according to claim 3, wherein the second member is flexibly connected to the side wall via the engagement between a screw and a sliding slot.

6. A warping buffering structure for a light guide plate, comprising:
   a first member with one side thereof contacting one end of the light guide plate of a backlight module;
   a second member with one side thereof flexibly connected to a side wall of a back cover of the backlight module, and the second member capable of sliding along an extending direction of the side wall;
   a first inclined surface formed on an end of one side of the first member which is away from the light guide plate;
   a second inclined surface formed on an end of one side of the second member which is away from the side wall, and the second inclined surface contacting the first inclined surface and being slidably engaged with the first inclined surface; and
   a curved portion extending from the first member towards the light guide plate, and one side of the curved portion facing the light guide plate contacting an upper end of the light guide plate.

7. The warping buffering structure according to claim 6, wherein the first inclined surface and a vertical surface of one end of the first member adjacent to a bottom wall of the back cover form an angle ranging from 180 degrees to 270 degrees, and the second inclined surface and a vertical surface of one end of the second member adjacent to the bottom wall form an angle ranging from 90 degrees to 180 degrees.

8. The warping buffering structure according to claim 7, wherein an inclined angle of the first inclined surface is complementary to that of the second inclined surface.

9. The warping buffering structure according to claim 8, wherein the second member is flexibly connected to the side wall via a dovetail slot structure.

10. The warping buffering structure according to claim 8, wherein the second member is flexibly connected to the side wall via the engagement between a screw and a sliding slot.

11. A backlight module, comprising:
    a light guide plate;
    a back cover; and
    a warping buffering structure for the light guide plate, comprising:
      a first member with one side thereof contacting one end of the light guide plate of a backlight module;
      a second member with one side thereof flexibly connected to a side wall of the back cover of the backlight module, and the second member capable of sliding along an extending direction of the side wall;
      a first inclined surface formed on an end of one side of the first member which is away from the light guide plate; and
      a second inclined surface formed on an end of one side of the second member which is away from the side wall, and the second inclined surface contacting the first inclined surface and being slidably engaged with the first inclined surface.

12. The backlight module according to claim 11, wherein the first inclined surface and a vertical surface of one end of the first member adjacent to a bottom wall of the back cover form an angle ranging from 180 degrees to 270 degrees, and the second inclined surface and a vertical surface of one end of the second member adjacent to the bottom wall form an angle ranging from 90 degrees to 180 degrees.

13. The backlight module according to claim 12, wherein an inclined angle of the first inclined surface is complementary to that of the second inclined surface.

14. The backlight module according to claim 13, wherein the second member is flexibly connected to the side wall via a dovetail slot structure.

15. The backlight module according to claim 13, wherein the second member is flexibly connected to the side wall via the engagement between a screw and a sliding slot.

16. The backlight module according to claim 11, wherein a curved portion extends from the first member towards the light guide plate, and one side of the curved portion facing the light guide plate contacts an upper end of the light guide plate.

* * * * *